(12) United States Patent
Saito et al.

(10) Patent No.: US 8,222,802 B2
(45) Date of Patent: Jul. 17, 2012

(54) RESIN COMPOSITION, REFLECTIVE PLATE AND LIGHT-EMITTING DEVICE

(75) Inventors: Shintaro Saito, Tsukuba (JP);
Sadanobu Iwase, Tsuchiura (JP);
Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/934,582

(22) PCT Filed: Mar. 17, 2009

(86) PCT No.: PCT/JP2009/055724
§ 371 (c)(1),
(2), (4) Date: Sep. 24, 2010

(87) PCT Pub. No.: WO2009/119530
PCT Pub. Date: Oct. 1, 2009

(65) Prior Publication Data
US 2011/0018421 A1      Jan. 27, 2011

(30) Foreign Application Priority Data
Mar. 28, 2008   (JP) ................................ 2008-086241

(51) Int. Cl.
*H01J 5/16* (2006.01)
(52) U.S. Cl. ........................................ 313/113; 313/498
(58) Field of Classification Search .................. 313/113, 313/498; 362/341, 296; 524/101, 127, 140–141
See application file for complete search history.

(56) References Cited

U.S. PATENT DOCUMENTS

| | | | |
|---|---|---|---|
| 5,268,414 A * | 12/1993 | Nakai et al. .................... | 524/539 |
| 5,529,716 A | 6/1996 | Nomura et al. | |
| 6,063,848 A | 5/2000 | Murakami et al. | |
| 2004/0165390 A1 * | 8/2004 | Sato et al. ..................... | 362/341 |
| 2005/0131121 A1 | 6/2005 | Tsutsumi et al. | |
| 2009/0250662 A1 | 10/2009 | Murouchi et al. | |

FOREIGN PATENT DOCUMENTS

| | | |
|---|---|---|
| DE | 2006-117814 A | 5/2006 |
| JP | 62-179780 A | 8/1987 |
| JP | 07-070422 A | 3/1995 |
| JP | 08-012863 A | 1/1996 |
| JP | 08-302172 A | 11/1996 |
| JP | 2000-080289 A | 3/2000 |
| JP | 2003-195020 A | 7/2003 |
| JP | 2004-277539 A | 10/2004 |
| JP | 2007-320996 A | 12/2007 |

OTHER PUBLICATIONS

English translation of JP 8-12863 issued Jan. 1996, to Sumitomo Chemical Co., Ltd.
Machine-generated English translation of JP 08-302172 issued Nov. 19, 1996, to Sumitomo Chemical Co., Ltd.
Machine-generated English translation of JP 2000-080289 issued Mar. 21, 2000 to Toray Ind. Inc.
Machine-generated English translation of JP 2004-277539 issued Oct. 7, 2004, to Sumitomo Chemical Co., Ltd.
Machine-generated English translation of JP 2007-320996, issued Dec. 13, 2007 to Toray Ind. Inc.

* cited by examiner

*Primary Examiner* — Vip Patel
(74) *Attorney, Agent, or Firm* — Sughrue Mion, PLLC

(57) ABSTRACT

The present invention provides a resin composition comprising the component (A) liquid-crystalline polyester, and the component (B) a titanium oxide filler having a volume average particle diameter of 0.27 to 0.4 μm, wherein the component (B) is contained in an amount of from 5 to 110 parts by mass relative to 100 parts by mass of the component (A); a reflective plate of the resin composition, and a light-emitting device having the reflective plate. According to the resin composition of the present invention, it is possible to obtain a reflective plate exhibiting high reflectance of a visible light while keeping excellent mechanical strength of the liquid-crystalline polyester. Also, a light-emitting device excellent in characteristics such as brightness can be obtained using the reflective plate.

9 Claims, No Drawings

RESIN COMPOSITION, REFLECTIVE PLATE AND LIGHT-EMITTING DEVICE

CROSS REFERENCE TO RELATED APPLICATIONS

This application is a National Stage of International Application No. PCT/JP2009/055724, filed on Mar. 17, 2009, which claims priority from Japanese Patent Application No. 2008-086241, filed on Mar. 28, 2008, the contents of all of which are incorporated herein by reference in their entirety.

TECHNICAL FIELD

The present invention relates to a resin composition suited for use in molding of a reflective plate, a reflective plate formed by using the resin composition, and a light-emitting device having the reflective plate.

BACKGROUND ART

Most of reflective plates used for an LED light-emitting device (light-emitting diode) and the like are made of a resin from the viewpoints of excellent workability and lightness in weight. In production of such a LED light-emitting device, the reflective plate can be exposed to high temperature environments in amounting step of a LED element, and a soldering step and a curing step of a sealing resin during assembling of a LED module. For this reason, as a resin material that forms the reflective plate, liquid-crystalline polyesters that are advantageous in terms of heat resistance and moldability are widely examined.

By the way, for the reflective plate used for the light-emitting device or the like, a high reflectance is required for achieving excellent brightness of the light-emitting device or the like. As a resin composition for such a reflective plate, a resin composition containing a filler capable of imparting a high reflectance and liquid-crystalline polyester has been proposed. For example, Japanese Unexamined Patent Publication No. 2007-320996 proposes a resin composition produced by blending titanium oxide and a blue coloring agent in liquid-crystalline polyester.

DISCLOSURE OF THE INVENTION

However, in the resin composition in which titanium oxide is blended as a high reflectance imparting agent, it is necessary to increase the blending proportion of the high reflectance imparting agent (charging amount of the high reflectance imparting agent) in order to improve the reflectance of the obtainable reflective plate. However, increase in a charging amount of the high reflectance imparting agent tends to lead to deterioration in mechanical strength, in particular, impact strength of the obtainable reflective plate, and in such a reflective plate, the reflective plate is possibly damaged depending on the production process of the light-emitting device.

In light of the above, it is an object of the present invention to provide a resin composition suited for obtaining a reflective plate exhibiting an excellent reflectance with respect to visible light while sufficiently keeping mechanical strength such as impact strength, a reflective plate using the resin composition, and a light-emitting device using the reflective plate.

As a result of diligent efforts, the present inventors have accomplished the present invention. Specifically, the present invention provides a resin composition comprising the following component (A) and component (B):

(A) a liquid-crystalline polyester,
(B) a titanium oxide filler having a volume average particle diameter of 0.27 to 0.4 μm,
wherein the component (B) is contained in an amount of from 5 to 110 parts by mass relative to 100 parts by mass of the component (A).

The present inventors also provide a reflective plate formed by molding the resin composition, and a light-emitting device having the reflective plate and a light-emitting element.

According to the resin composition of the present invention, it is possible to obtain a reflective plate exhibiting a high reflectance with respect to visible light while keeping excellent mechanical strength of the liquid-crystalline polyester. This is industrially extremely useful because a light-emitting device having excellent characteristics such as brightness can be obtained by using the reflective plate.

MODE FOR CARRYING OUT THE INVENTION

The resin composition of the present invention comprises the following components (A) and (B):

(A) a liquid-crystalline polyester, and
(B) a titanium oxide filler having a volume average particle diameter of 0.27 to 0.4 μm,
wherein the component (B) is contained in an amount of from 5 to 110 parts by mass of relative to 100 parts by mass of the component (A).

Hereinafter, various embodiments for these components, a resin composition of the present invention comprising these components, and a reflective plate and a light-emitting device using the resin composition will be sequentially described.

<Component (A)>

Liquid-crystalline polyester as the component (A) is a polyester called a thermotropic liquid-crystalline polymer, which is a polymer capable of forming a melt exhibiting optical anisotropy at a temperature of 450° C. or lower.

Specific examples of the liquid-crystalline polyester include:

(1) a liquid-crystalline polyester obtained by polymerization of a combination of aromatic hydroxycarboxylic acid, aromatic dicarboxylic acid and aromatic diol, (2) a liquid-crystalline polyester obtained by polymerization of plurality of kinds of aromatic hydroxycarboxylic acids, (3) a liquid-crystalline polyester obtained by polymerization of a combination of aromatic dicarboxylic acid and aromatic diol, and (4) a liquid-crystalline polyester obtained by reacting aromatic hydroxycarboxylic acid with crystalline polyester such as polyethylene terephthalate.

As an alternative to the aforementioned aromatic hydroxycarboxylic acid, aromatic dicarboxylic acid or aromatic diol, ester-forming derivatives thereof may be used, and such ester-forming derivatives is advantageous in facilitating production of liquid-crystalline polyester.

Here, the ester-forming derivatives will be described in reference to specific examples thereof.

Examples of the ester-forming derivatives of aromatic hydroxycarboxylic acid or aromatic dicarboxylic acid having an intramolecular carboxyl group include a compound obtained by converting the carboxyl group into a highly reactive acid halide or acid anhydride group, or a compound in which an ester is provided using an alcohol or ethylene glycol so that the carboxyl group provides a polyester by an ester exchange reaction.

On the other hand, examples of the ester-forming derivative of aromatic hydroxycarboxylic acid or aromatic diol having an intramolecular phenolic hydroxyl group include a compound in which an ester is provided using a lower carboxylic acid so that the phenolic hydroxyl group is allowed to generate a polyester by an ester exchange reaction.

Also, as far as the ester formability is not adversely affected, the aforementioned aromatic hydroxycarboxylic acid, aromatic dicarboxylic acid or aromatic diol may have a halogen atom such as a chlorine atom or a fluorine atom; an alkyl group such as a methyl group or an ethyl group; or an aryl group such as a phenyl group as a substituent in its aromatic ring.

Examples of a structural unit that can form the liquid-crystalline polyester include the following structures.

Structural units derived from the aromatic hydroxycarboxylic acid may include:

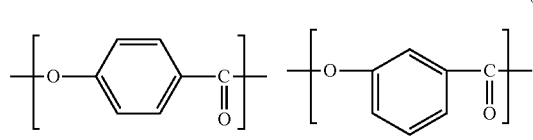
(A$_1$)

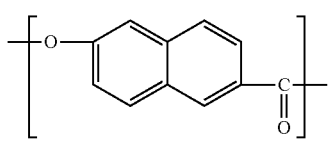
(A$_2$)

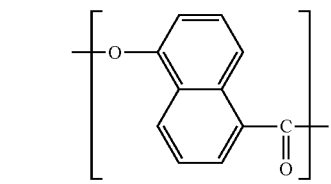

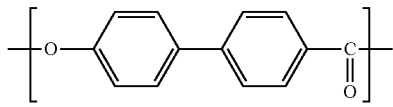

These structural units may have a halogen atom, an alkyl group or an aryl group as a substituent.

Structural units derived from the aromatic dicarboxylic acid may include:

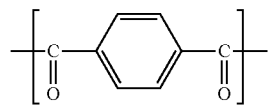
(B$_1$)

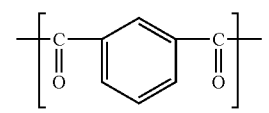
(B$_2$)

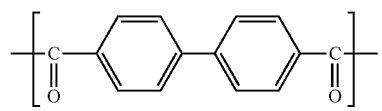

-continued

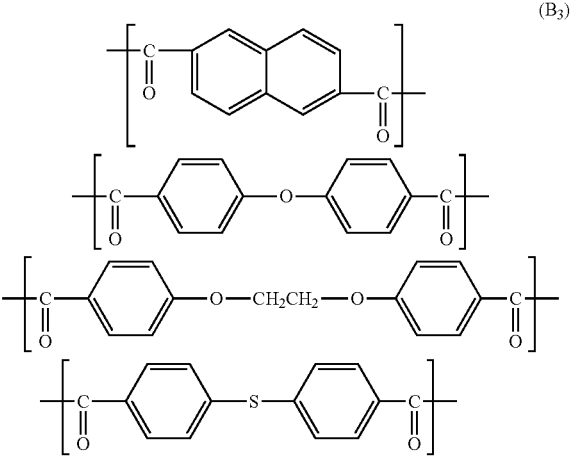
(B$_3$)

These structural units may have a halogen atom, an alkyl group or an aryl group as a substituent.

Structural units derived from the aromatic diol may include:

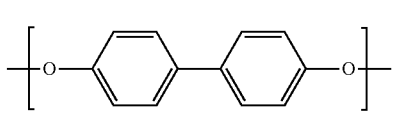
(C$_1$)

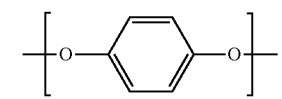
(C$_2$)

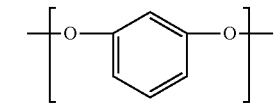
(C$_3$)

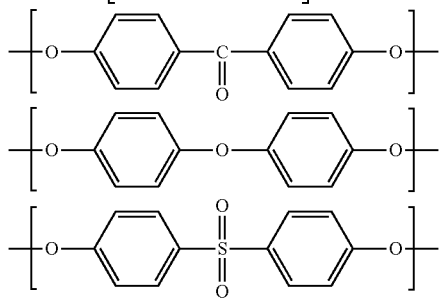

These structural units may have a halogen atom, an alkyl group or an aryl group as a substituent.

Preferred combinations of structural units for the liquid-crystalline polyester include the following combinations (a) to (h), each unit being represented by the structural units shown in the above examples.

(a): a combination of the units (A$_1$), (B$_1$) and (C$_1$), or a combination of the units (A$_1$), (B$_1$), (B$_2$) and (C$_1$)

(b): a combination of the units (A$_2$), (B$_3$) and (C$_2$), or a combination of the units (A$_2$), (B$_1$), (B$_3$) and (C$_2$)

(c): a combination of the units (A$_1$) and (A$_2$)

(d): a combination (a) of structural units in which the unit (A$_1$) is partly or entirely substituted with the unit (A$_2$)

(e): a combination (a) of structural units in which the unit (B$_1$) is partly or entirely substituted with the unit (B$_3$)

(f): a combination (a) of structural units in which the unit ($C_1$) is partly or entirely substituted with the unit ($C_3$)

(g): a combination (b) of structural units in which the unit ($A_2$) is partly or entirely substituted with the unit ($A_1$)

(h): a combination (c) of structural units added with the units ($B_1$) and ($C_2$)

As shown in the above combinations (a) to (h), particularly preferred liquid-crystalline polyesters which can be used as the component (A) has, as its structural units, the unit(s) ($A_1$) and/or ($A_2$) as a structural unit derived from the aromatic hydroxycarboxylic acid; at least one unit selected from the group consisting of the units ($B_1$), ($B_2$) and ($B_3$) as a structural unit derived from the aromatic diol; and at least one unit selected from the group consisting of the units ($C_1$), ($C_2$) and ($C_3$) as a structural unit derived from the aromatic dicarboxylic acid.

The liquid-crystalline polyester used as the component (A) preferably has a flow starting temperature of from 270 to 400° C., and more preferably has a flow starting temperature of from 300 to 380° C. A reflective plate that can be obtained from the resin composition comprising a liquid-crystalline polyester having a flow starting temperature of lower than 270° C. as the component (A) tends to cause deformation in the reflective plate itself or an occurrence of blister (abnormal expansion) in a high-temperature environment such as in a LED module assembling step, when it is used in a light-emitting device where LED serves as a light-emitting element. On the other hand, in the case of a resin composition comprising a liquid-crystalline polyester having a flow starting temperature of higher than 400° C. as the component (A), it may be necessary to increase the molding temperature in molding of the resin composition, so that production of the reflective plate tends to be relatively difficult. When a reflective plate is molded at a molding temperature of 400° C. or higher using the resin composition, the liquid-crystalline polyester is more likely to heat-deteriorate under the influence of titanium oxide, and in the worst case, discoloring of the reflective plate may deteriorate the reflectance.

The term flow starting temperature used herein refers to a temperature at which a melt viscosity shows 4800 Pa·sec when a melt heated at a temperature elevation speed of 4° C./minute is extruded through a nozzle with a load of 9.8 MPa using a capillary rheometer equipped with a nozzle of 1 mm in inside diameter and 10 mm in length, and the flow starting temperature is an index representing a molecular weight of liquid-crystalline polyester that is well known in the art (see Naoyuki Koide ed., "Liquid-crystalline polymer synthesis, molding and application", pp. 95-105, CMC, published on Jun. 5, 1987).

As a production method of liquid-crystalline polyester used as the component (A), various methods known in the art may be employed, and a method capable of producing liquid-crystalline polyester having a YI value of 32 or less as described in Japanese Unexamined Patent Publication No. 2004-256673 is preferred.

One specific example of a preferred production method of liquid-crystalline polyester disclosed in the above publication will be described below.

A mixture of aromatic hydroxycarboxylic acid, aromatic diol, and aromatic dicarboxylic acid is allowed to react with fatty acid anhydride at 130 to 180° C. in a nitrogen atmosphere, and phenolic hydroxyl groups of aromatic hydroxycarboxylic acid and aromatic diol are allowed to react with fatty acid anhydride to acylate the same, to thereby obtain an acylated compound (acylated aromatic hydroxycarboxylic acid and acylated aromatic diol). Then the temperature is further elevated, and ester exchange is allowed between an acyl group of the acylated compound, and carboxyl groups of the acylated aromatic hydroxycarboxylic acid and the aromatic dicarboxylic acid while a byproduct of the reaction is distilled off outside the reaction system, so that they are polycondensed to produce liquid-crystalline polyester.

In this production method, an equivalent ratio of the phenolic hydroxyl groups to the carboxyl groups in the mixture of the aromatic hydroxycarboxylic acid, the aromatic diol and the aromatic dicarboxylic acid is preferably in a range of from 0.9 to 1.1.

The amount of the fatty acid anhydride used is preferably 0.95 to 1.2 times equivalent amount, and more preferably 1.00 to 1.15 times equivalent amount, relative to the total amount of phenolic hydroxyl groups of the aromatic diol and the aromatic hydroxycarboxylic acid.

When the amount of fatty acid anhydride used is small, coloring of the liquid-crystalline polyester tends to be suppressed, however, when the amount of fatty acid anhydride used is too small, unreacted aromatic diol or aromatic dicarboxylic acid are likely to sublimate at the time of polycondensation, and the reaction system tends to be clogged. On the other hand, when the amount of fatty acid anhydride used exceeds 1.2 times equivalent amount, coloring of the obtained liquid-crystalline polyester is significant so that the reflectance of the reflective plate may be deteriorated.

Examples of the fatty acid anhydride include, which are not limited to, acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, and β-bromopropionic anhydride. Mixture of two or more kinds of these may be used. From the viewpoints of the cost and the handling, acetic anhydride, propionic anhydride, butyric anhydride, and isobutyric anhydride are preferably used, and the acetic anhydride is more preferably used.

Ester exchange (polycondensation) reaction is conducted preferably at a temperature of from 130 to 400° C. elevating at a rate of 0.1 to 50° C./minute, and more preferably at a temperature of from 150 to 350° C. elevating at a rate of 0.3 to 5° C./minute.

For further smoothing the ester exchange (polycondensation) reaction, a byproduct may be distilled off outside the system.

In the foregoing production method disclosed in Japanese Unexamined Patent Publication No. 2004-256673, the ester exchange (polycondensation) reaction is preferably conducted in the presence of a heterocyclic organic base compound containing two or more nitrogen atoms from the viewpoint of further smoothening production of the liquid-crystalline polyester and sufficiently suppressing coloring of the obtainable liquid-crystalline polyester. The reason is that the nitrogen-containing heterocyclic organic base compound further smoothens production of the liquid-crystalline polyester and sufficiently suppresses coloring of the obtainable liquid-crystalline polyester.

Examples of the heterocyclic organic base compound include imidazole compounds, triazole compounds, dipyridinyl compounds, phenanthroline compounds and diazaphenanthrene compounds. Among these, imidazole compounds are preferably used from the viewpoint of reactivity, and 1-methylimidazole, and 1-ethylimidazole are more preferably used because of their availability. The nitrogen-containing heterocyclic organic base compound may coexist in a reaction system in the course of production of the aforementioned acylated compound, or the nitrogen-containing heterocyclic organic base compound may also blended in the step of mixing the aforementioned aromatic hydroxycarboxylic acid, aromatic diol and aromatic dicarboxylic acid.

Also in the present invention, for the purpose of increasing polycondensation speed by further promoting the ester exchange (polycondensation) reaction, a catalyst other than the heterocyclic organic base compound may be used unless the effect of the present invention is impaired. When a metal salt or the like is used as a catalyst, the metal salt will remain in the liquid-crystalline polyester as impurities, and such impurities can adversely affect on an electronic component like a reflective plate. Also from this point, use of the heterocyclic organic base compound is a particularly preferred embodiment for production of liquid-crystalline polyester for use as the component (A).

Examples of a method of further improving a polymerization degree of liquid-crystalline polyester include a method of reducing internal pressure of a reaction vessel for the ester exchange (polycondensation) reaction (reduced pressure polymerization), and a method in which a reaction product after the ester exchange (polycondensation) reaction is cooled and solidified, then the product is ground into a powder form, and the obtained powder reaction product is solid-phase polymerized in a condition of, for example, 250 to 350° C. for 2 to 20 hours. By improving the polymerization degree in such a manner, a liquid-crystalline polyester having a desirable flow starting temperature can be easily produced. A solid-phase polymerization is preferably employed from the viewpoint that the facility is simple.

Here, the polycondensation in which the aforementioned acylation reaction and ester exchange reaction are combined, and the subsequent solid-phase polymerization are preferably conducted in an atmosphere of inert gas such as nitrogen.

The liquid-crystalline polyester thus produced may be a liquid-crystalline polyester exhibiting a YI value of 32 or less as described in the Japanese Unexamined Patent Publication No. 2004-256673, and is particularly preferred as the component (A). Here, the YI value is a value obtained by measurement of a test piece made of the liquid-crystalline polyester by means of a color difference meter. The YI value is an index representing yellowness of an object, is defined in ASTM D1925, and can be determined using the following formula:

$$YI=[100(1.28X-1.06Z)/Y]$$

(wherein, X value, Y value and Z value respectively represent tristimulus values in a XYZ color system.)

While the liquid-crystalline polyester having a YI value of 32 or less obtained in the production method using the heterocyclic organic base compound is particularly preferable for use as the component (A), a mixture of liquid-crystalline polyesters exhibiting a YI value of 32 or less may be obtained by mixing plurality of kinds of liquid-crystalline polyesters. Also in this case, by determining the YI value of the mixture of the plurality of kinds of liquid-crystalline polyesters (liquid-crystalline polyester mixture) in such a manner as described above, it is possible to select a mixture of the liquid-crystalline polyesters preferred for use as the component (A).

<Component (B)>

The component (B), a titanium oxide filler used in the present invention, is mainly made from titanium oxide. The titanium oxide filler may have a volume average particle diameter in a range of from 0.27 to 0.4 μm, and may contain a trace of impurities as long as the effects of the present invention is adversely affected. When the volume average particle diameter of the titanium oxide filler is less than 0.27 μm, a reflectance with respect to visible light, in particular, a reflectance with respect to a light beam of relatively short wavelength (light beam having a wavelength of from about 0.44 μm to about 0.48 μm, hereinafter also sometimes referred to as "blue light") tends to decrease. Heretofore, it has been believed that a titanium oxide of relatively fine particles (having a small volume average particle diameter) may be used for obtaining a reflective plate having an excellent reflectance of blue light. This is because microparticles having a volume average particle diameter equal to half-wavelength of the light are believed to improve the color tone of the reflective plate (Manabu Kiyono, "Titanium oxide—Physical property and application technique", item 97, item 162, *Gijutudo-Shuppan Kabushiki-kaisya,* 1st edition, published on Jun. 25, 1991). According to this idea, microparticles having a volume average particle diameter of from 0.21 to 0.25 μm (titanium oxide) are used for efficient reflection of blue light.

Contrarily to such a technical common sense, the present inventors surprisingly have found that a reflective plate using one having a larger volume average particle diameter than that of conventionally contemplated titanium oxide filler exhibits a high reflectance with respect to blue light. However, when the volume average particle diameter of the titanium oxide filler exceeds 0.4 μm, the reflectance of the obtainable reflective plate tends to decrease. The method of producing titanium oxide in a chlorine method as will be described later is a preferable production method in that titanium oxide having a rutile crystal type is obtained. However, since the volume average particle diameter of the titanium oxide obtained is sometimes small, it is preferred to control the conditions appropriately so that the titanium oxide having a volume average particle diameter in a range of from 0.27 to 0.4 μm, which is suitable for the present invention, is obtained when a titanium oxide for the present invention is obtained by a chlorine method.

The volume average particle diameter of the titanium oxide filler is preferably in a range of 0.27 to 0.37 μm, more preferably in a range of 0.27 to 0.32 μm, and further preferably in a range of 0.27 to 0.30 μm. Also as the titanium oxide filler, a titanium oxide which has been subjected to a surface treatment (described below) may be used.

The term volume average particle diameter used herein is determined by measuring appearance of titanium oxide filler by a scanning electron microscope (SEM), and plotting a particulate quantity (%) in each particle diameter section of primary particles from the obtained SEM image using an image analyzer (for example, "LUZEX IIIU" available from Nireco Corporation) to determine a distribution curve, and determining a particle diameter of cumulated frequency of 50% as a volume average particle diameter from the cumulated distribution curve.

Further, the present inventors have found that by using a titanium oxide filler having a volume average particle diameter of from 0.27 to 0.4 m, excellent mechanical strength of the liquid-crystalline polyester itself is sufficiently maintained, and a reflective plate having excellent impact strength is obtained. When a titanium oxide filler having a volume average particle diameter of less than 0.27 μm is used, a reflective plate having a high reflectance can be obtained by increasing the filling amount, however, in such a case, mechanical strength, in particular, impact strength of the reflective plate tends to be significantly deteriorated. When a large amount of the titanium oxide filler is used, the resulting reflective plate tends to have a part where the titanium oxide filler aggregates, the part being fragile so that cracking or the like is likely to occur starting from the fragile part on impact. On the other hand, in the reflective plate obtained from the resin composition of the present invention, the titanium oxide filler is hard to aggregate, and realizes excellent impact strength of the plate.

A crystalline type of titanium oxide itself contained in the titanium oxide filler used as the component (B) is not particularly limited, and may be a rutile type, an anatase type, or may be titanium oxide mixing these types. When a reflective plate with excellent weather resistance as well as a high reflectance is requested, a titanium oxide filler comprising a rutile-type titanium oxide of is preferably used as the component (B).

In the present invention, since a titanium oxide filler having a relatively large volume average particle diameter is used as the component (B), a titanium oxide filler excellently disperses in the resulting molded article. Therefore, even when the blending proportion of the component (B) is relatively large, a reflective plate having excellent impact strength is obtained. Therefore, a blending proportion of the component (B) can be adjusted depending on a desired reflectance. Since a surface area can be reduced by increasing the volume average particle diameter of the titanium oxide filler, deterioration of the liquid-crystalline polyester due to a catalytic action of titanium oxide can also be suppressed. A blending proportion of the component (B) in the resin composition of the present invention is 5 to 110 parts by mass, preferably 5 to 80 parts by mass, and more preferably 10 to 75 parts by mass, relative to 100 parts by mass of the component (A). When the blending proportion of the component (B) is less than 5 parts by mass, a reflective plate having a practical reflectance is difficult to obtain, whereas when it is more than 110 parts by mass, production of a reflective plate tends to be difficult, and characteristics such as mechanical characteristic and heat resistance of the liquid-crystalline polyester cannot be sufficiently maintained. Although the cause of deteriorating the characteristics of the liquid-crystalline polyester is not necessarily clear, the present inventors suppose that one reason is that titanium oxide contained in the titanium oxide filler or a surface treatment agent of titanium oxide act like a catalyst to cleave an ester bond of the liquid-crystalline polyester, and the molecular weight of the liquid-crystalline polyester is lowered. When the amount of the component (B) relative to the component (A) falls within the aforementioned range, a reflective plate exhibiting an excellent reflectance can be produced while the mechanical strength of the liquid-crystalline polyester is sufficiently maintained.

When plurality of kinds of titanium oxide fillers are used as the component (B), a blending proportion of a total of the fillers relative to the component (A) may be within the aforementioned range.

A surface treatment may be conducted on a titanium oxide filler used as the component (B), for example, for improving dispersibility in a molded article. A surface treatment using inorganic metal oxide is preferred from the viewpoint of further improvement in dispersibility, or in other words, a surface treatment that makes the inorganic metal oxide be adhered on the surface of titanium oxide is preferred. As the inorganic metal oxide used for the surface treatment, alumina is particularly preferred from the viewpoint of improvement in dispersibility. The resulting titanium oxide filler, which has been subjected to such a surface treatment, may have a volume average particle diameter after the surface treatment in a range of from 0.27 to 0.4 μm, preferably in a range of from 0.27 to 0.37 μm, more preferably in a range of from 0.27 to 0.32 μm, and most preferably in a range of from 0.27 to 0.30 μm.

As the titanium oxide filler used in the present invention, those having high dispersibility are preferred. Although it is not necessarily required to use a surface-treated titanium oxide filler, the surface-treated titanium oxide filler is often preferred because it is hard to aggregate and often easy to handle. While the aforementioned surface treatment can be exemplified as a method of improving the dispersibility of the titanium oxide filler, the dispersibility can be improved in other method without limited to this method.

As a method of producing the titanium oxide filler used as the component (B), a chlorine method is preferred, and a titanium oxide filler comprising a titanium oxide produced by the chlorine method is particularly useful as the component (B). Production of a titanium oxide filler by the chlorine method referred herein will be briefly described. An ore which is a source of titanium (such as synthetic rutiles obtained from rutile ore or ilmenite ore) is allowed to react with chlorine at about 1000° C. to make crude titanium tetrachloride, and the crude titanium tetrachloride is purified by rectification, and then the obtained titanium tetrachloride is oxidized with oxygen to obtain titanium oxide. According to this chlorine method, titanium oxide of rutile type, which is a preferred crystal type, can be obtained. And by optimizing the condition in the step of oxidizing with oxygen (oxidizing step), a titanium oxide having relatively excellent whiteness tends to be obtained, and a titanium oxide filler comprising such a titanium oxide is particularly preferred as the component (B) of the present invention. Also by optimizing the condition in the oxidizing step, generation of coarse particles is suppressed, and there are also advantages such that a titanium oxide filler having a volume average particle diameter that is applicable to the component (B) of the present invention can be readily obtained. Also by classifying in a known operation the titanium oxide thus produced by the chlorine method, a titanium oxide (titanium oxide filler) having a preferred volume average particle diameter as the component (B) of the present invention can be selected.

Examples of a commercial product of the titanium oxide filler usable as the component (B) include "TIPAQUE CR-58" available from ISHIHARA SANGYO KAISHA LTD., "TITANIX JR-301, WP0042" available from TAYCA Corporation and the like. The "TIPAQUE CR-58" is made of the titanium oxide produced by the chlorine method, and "TITANIX JR-301, WP0042" is made of the titanium oxide produced by a production method called a sulfuric acid method.

<Resin Composition>

A resin composition of the present invention comprises the components (A) and (B), and a blending ratio between Components (A) and (B) in the resin composition is as described above. Hereinafter, the resin composition will be described.

To the resin composition, a filler other than the component (B) (hereinafter, referred to as "other filler") may be added when necessary.

When the other filler is added, the other filler is used preferably in an amount of from 5 to 100 parts by mass, and more preferably in an amount of from 5 to 90 parts by mass, relative to 100 parts by mass of the liquid-crystalline polyester. When the amount of other filler added exceeds 100 parts by mass, decrease in color tone of the reflective plate and deterioration in granulation due to increased melt viscosity of the resin composition tend to occur, and when a small-sized reflective plate is molded, the moldability tends to decrease. In using the other filler, an inorganic filler is preferably used.

Examples of the inorganic filler include white pigments other than titanium oxide such as zinc oxide, zinc sulfide and white lead, inorganic fibers such as glass fiber, carbon fiber, metal fiber, alumina fiber, boron fiber, titanate fiber, wollastonite and asbestos, powders such as silicon dioxide, calcium carbonate, alumina, aluminum hydroxide, kaolin, talc, clay, mica, glass flake, glass beads, hollow glass beads, dolomite, various metal powders, barium sulfate, potassium titanate and calcined plaster, powder and granular, sheet-like, whisker-like inorganic compounds such as silicon carbide, alumina, boron nitride, aluminum borate and silicon nitride.

Among these, for increasing the weld strength of the reflective plate without significantly deteriorating the reflectance of the reflective plate, inorganic fibers such as glass fiber, titanate fiber and wollastonite, powder and granular, sheet-like, whisker-like inorganic compounds such as silicon oxide, aluminum borate and silicon nitride, and talc are preferably used. Also, such a preferable inorganic filler is able to reduce a mold shrinkage factor and anisotropy of mechanical property derived from a molecular chain orientation peculiar to the liquid-crystalline polyester, and thus is advantageous in production of a reflective plate.

In such an inorganic filler, a binder may be used. However, from the viewpoint of suppressing decrease in color tone, the smaller amount of the binder, the more preferred.

To the resin composition of the present invention, at least one kind of commonly used additives including a mold release improver (such as fluorine resin, higher fatty acid ester compounds or fatty acid metal soaps; a coloring agent such as dye or a pigment; an antioxidant; a heat stabilizer; a fluorescent brightener; an UV absorber; an antistatic agent; and a surfactant) may be added as long as the effect of the present invention is not impaired. Also, an additive having an external lubricant effect (such as higher fatty acid, higher fatty acid ester, a higher fatty acid metal salt and a fluorocarbon-based surfactant) may be added.

The resin composition of the present invention may be obtained by mixing the component (A), the component (B) and other inorganic filler if necessary, while the production method of the composition is not limited. Examples of the method include a method comprising a step of mixing the components by a Henschel mixer, a tumbler or the like, followed by melt kneading using an extruder; and by such a melt kneading, the resin composition can be obtained in a palletized form. The resin composition thus palletized has excellent operability, and extends the range of selection of a preferred molding method depending on the shape of the intended parts.

<Reflective Plate>

The reflective plate of the present invention may be obtained by melt-molding the resin composition of the present invention by a variety of commonly-used molding methods. Examples of the molding method include an injection molding method, an injection compression molding method, an extrusion molding method and the like. Among these, the injection molding is preferred. By injection molding, a molded article having a complicated shape such as a shape with a thin-thickness portion can be obtained. In particular, the resin composition of the present invention is suited for production of a small-sized reflective plate having a thin-thickness portion with a thickness of from 0.01 mm to 3 mm, preferably a thin-thickness portion with a thickness of from 0.02 mm to 2 mm, and more preferably a thin-thickness portion with a thickness of from 0.05 mm to 1 mm.

Preferably, a molding temperature in a melt molding such as injection molding is higher by 10 to 60° C. than the flow starting temperature of the resin composition used in the melt molding. When the molding temperature is lower than the aforementioned temperature range, fluidity of the composition tends to decrease, and deterioration in moldability or decrease in strength of the reflective plate may be caused. When the molding temperature exceeds the aforementioned temperature range, the liquid-crystalline polyester tends to be much deteriorated, and reduction in reflectance of the reflective plate tends to decrease. The flow starting temperature of the resin composition can be determined using a capillary type rheometer in the same manner as described for a measuring method of flow temperature of liquid-crystalline polyester.

The reflective plate of the present invention excels in reflectance of a light beam of a visible light region, and especially excels in reflectance of blue light. More specifically, it becomes possible to produce a reflective plate having a reflectance of 70% or higher with respect to a light beam having a wavelength of 460 nm. This reflectance is preferably in a range of 75% or higher, and more preferably in a range of 80% or higher. The reflectance used herein can be determined on a basis of a total light reflectance measuring method A (using a standard white plate of barium sulfate) of JIS K7105-1981.

The reflective plate of the present invention can be suitably used for a member related to light reflection, particularly a member related to visible light reflection, in the fields of electrics, electronics, automobiles, mechanics and the like. For example, it may be suitably used as a lamp reflector in a light source device such as a halogen lamp or HID, or as a high-strength reflective plate in a light-emitting device or a display device using a light-emitting device such as an LED or an organic EL. In particular, it may be used suitably as a reflective plate for use in a light-emitting device using an LED.

EXAMPLES

Hereinafter, the present invention will be described more specifically in reference to Examples, which should not be construed as a limitation upon the scope of the present invention. Physical properties shown in Examples were determined in the following manners.

(1) Reflectance

On a surface of a reflective plate test piece of 64 mm×64 mm×1 mm, a diffusion reflectance of a light (with a measurement wavelength of 460 nm) was measured using an automatic recording spectrophotometer (U-3500: available from Hitachi, Ltd.). Herein a reflectance is a relative value under the conditions where a diffusion reflectance of a standard white plate of barium sulfate is to be 100%.

(2) Izod Impact Strength

A test piece of 64 mm in length, 12.7 mm in width and 6.4 mm in thickness was obtained by molding a resin composition by an injection molding machine, and an Izod impact strength of the test piece was measured by an ASTM D256.

Fillers used for obtaining test pieces of reflective plates in Examples and Comparative Examples are shown below. Titanium oxide filler:

TIPAQUE CR-60 (available from ISHIHARA SANGYO KAISHA, LTD., containing titanium oxide produced by a chlorine method, alumina surface-treated article, average particle diameter 0.21 µm, hereinafter referred to as "CR-60")

TIPAQUE CR-50 (available from ISHIHARA SANGYO KAISHA, LTD., containing titanium oxide produced by a chlorine method, alumina surface-treated article, average particle diameter 0.25 µm, hereinafter referred to as "CR-50")

SR-1 (available from SAKAI CHEMICAL INDUSTRY Co., LTD., containing titanium oxide produced by a sulfuric acid method, alumina surface-treated article, average particle diameter 0.26 µm, hereinafter referred to as "SR-1")

TIPAQUE CR-58 (available from ISHIHARA SANGYO KAISHA, LTD., containing titanium oxide produced by a chlorine method, alumina surface-treated article, average particle diameter 0.28 μm, hereinafter referred to as "CR-58")

TITANIX JR-301 (available from TAYCA CORPORATION, containing titanium oxide produced by a sulfuric acid method, alumina surface-treated article, average particle diameter 0.30 μm, hereinafter referred to as "JR-301")

TITANIX WP0042 (available from TAYCA CORPORATION, containing titanium oxide produced by a sulfuric acid method, alumina surface-treated article, average particle diameter 0.34 μm, hereinafter referred to as "WP0042")

TITANIX JR-1000 (available from TAYCA CORPORATION, containing titanium oxide produced by a sulfuric acid method, alumina surface-treated article, average particle diameter 1.0 μm, hereinafter referred to as "JR-1000")

Glass Fiber:

EFH75-01 (available from Central Glass Co., Ltd.; hereinafter referred to as "EFH75")

EFDE50-01 (available from Central Glass Co., Ltd.; hereinafter referred to as "EFDE50")

CS03JAPX-1 (available from ASAHI FIBER GLASS CO., Ltd.; hereinafter referred to as "CS03")

Example 1

Into a reaction vessel equipped with a stirrer, a torque meter, a nitrogen gas introducing tube, a thermometer and a reflux condenser were charged 994.5 g (7.2 mol) of parahydroxybenzoic acid, 446.9 g (2.4 mol) of 4,4'-dihydroxybiphenyl, 299.0 g (1.8 mol) of terephthalic acid, 99.7 g (0.6 mol) of isophthalic acid and 1347.6 g (13.2 mol) of acetic anhydride, and added 0.2 g of 1-methylimidazole, and after replacing the interior of the reaction vessel sufficiently with a nitrogen gas, the temperature was elevated to 150° C. over 30 minutes under nitrogen gas flow, and the reaction was refluxed for an hour while being retained at this temperature.

Thereafter, 0.9 g of 1-methylimidazole was added, and the temperature was elevated to 320° C. over 2 hours and 50 minutes while by-product acetic acid or unreacted acetic anhydride were distilled off, and a pre-polymer was obtained with the point of time at which torque increase is observed being end of the reaction.

The obtained pre-polymer was cooled to room temperature, ground by a crude grinder, and the temperature was elevated from room temperature to 250° C. over an hour and elevated from 250° C. to 285° C. over five hours, and retained for 3 hours at 285° C., under a nitrogen atmosphere, and thus solid-phase polymerization was achieved. The flow starting temperature of the obtained liquid-crystalline polyester was 327° C. The liquid-crystalline polyester obtained in this manner is called liquid-crystalline polyester 1.

After mixing a titanium oxide filler and a glass fiber with the obtained liquid-crystalline polyester 1 in blending proportions shown in Table 1, a resin composition was obtained by a biaxial extruder (PCM-30, available from IKEGAI Ltd.). The obtained resin composition was molded by an injection molder (type PS40E5ASE available from Nissei Plastic Industrial Co., Ltd.) at a temperature of 340° C., and a reflective plate test piece having a dimension of 64 mm×64 mm×1 mm and an Izod strength measuring test piece were obtained. These test pieces were used for measurements. Results are shown in Table 1. In the molding for obtaining the reflective plate test piece, a mirror-finished die was used.

Examples 2 to 5 and Comparative Examples 1 to 4

After mixing a titanium oxide filler and a glass fiber with the liquid-crystalline polyester 1 obtained in the same manner as in Example 1 in blending proportions shown in Table 1 or Table 2, test pieces were respectively obtained in the same manner as in Example 1, and various measurements were conducted. Results are shown in Table 1 or Table 2.

Example 6

Into a reaction vessel equipped with a stirrer, a torque meter, a nitrogen gas introducing tube, a thermometer and a reflux condenser were charged 994.5 g (7.2 mol) of parahydroxybenzoic acid, 446.9 g (2.4 mol) of 4,4'-dihydroxybiphenyl, 358.8 g (2.16 mol) of terephthalic acid, 39.9 g (0.24 mol) of isophthalic acid and 1347.6 g (13.2 mol) of acetic anhydride, and added 0.2 g of 1-methylimidazole, and after replacing the interior of the reaction vessel sufficiently with a nitrogen gas, the temperature was elevated to 150° C. over 30 minutes under nitrogen gas flow, and the reaction was refluxed for an hour while being retained at this temperature.

Thereafter, the temperature was elevated to 320° C. over 2 hours and 50 minutes while by-product acetic acid or unreacted acetic anhydride were distilled off, and a pre-polymer was obtained with the point of time at which torque increase is observed being end of the reaction.

The obtained pre-polymer was cooled to room temperature, ground by a crude grinder, and the temperature was elevated from room temperature to 250° C. over an hour and elevated from 250° C. to 305° C. over five hours, and retained for 3 hours at 305° C., under a nitrogen atmosphere, and thus solid-phase polymerization was achieved. The flow starting temperature of the obtained liquid-crystalline polyester was 357° C. The liquid-crystalline polyester obtained in this manner is called liquid-crystalline polyester 2.

After mixing a titanium oxide filler and a glass fiber with the obtained liquid-crystalline polyester 2 in blending proportions shown in Table 1, a reflective plate test piece and a test piece for an Izod strength measuring were obtained in the same manner as in Example 1, and various measurements were conducted. Results are shown in Table 1.

Examples 7 to 9 and Comparative Examples 5 to 7

After mixing a titanium oxide filler and a glass fiber with the liquid-crystalline polyester 2 obtained in the same manner as in Example 2 in blending proportions shown in Table 1 or Table 2, test pieces were respectively obtained in the same manner as in Example 2, and various measurements were conducted. Results are shown in Table 1 or Table 2.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Liquid-crystalline polyester 1 | Part by mass | 100 | 100 | 100 | 100 | 100 |  |  |  |  |
| Liquid-crystalline polyester 2 | Part by mass |  |  |  |  |  | 100 | 100 | 100 | 100 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Titanium oxide filler | Part by mass | CR-58 80 | JR-301 80 | WP0042 80 | JR-301 89 | JR-301 100 | CR-58 40 | CR-58 55 | JR-301 55 | WP0042 55 |
| Glass fiber | Part by mass | CS03 20 | CS03 20 | CS03 20 | CS03 33 | CS03 22 | EFH75 60 | EFDE50 27 | EFDE50 27 | EFDE50 27 |
| Titanium oxide filler Volume average particle diameter | μm | 0.28 | 0.30 | 0.34 | 0.30 | 0.30 | 0.28 | 0.28 | 0.30 | 0.34 |
| Reflectance (460 nm) | % | 85.1 | 84.5 | 83.6 | 84.6 | 85.4 | 72.2 | 78.9 | 78.5 | 77.7 |
| Izod impact strength | J/M | 156 | 217 | 341 | 187 | 173 | 345 | 387 | 398 | 403 |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Liquid-crystalline polyester 1 | Part by mass | 100 | 100 | 100 | 100 |  |  |  |
| Liquid-crystalline polyester 2 | Part by mass |  |  |  |  | 100 | 100 | 100 |
| Titanium oxide filler | Part by mass | CR-60 80 | CR-50 80 | SR-1 80 | JR-1000 80 | CR-60 40 | SR-1 40 | JR-1000 55 |
| Glass fiber | Part by mass | CS03 20 | CS03 20 | CS03 20 | CS03 20 | EFH75 60 | EFH75 60 | EFH75 27 |
| Titanium oxide filler Volume average particle diameter | μm | 0.21 | 0.25 | 0.26 | 1.0 | 0.21 | 0.26 | 1.0 |
| Reflectance (460 nm) | % | 83.6 | 80.4 | 83.4 | 74.6 | 71.0 | 71.2 | 68.6 |
| Izod impact strength | J/M | 119 | 156 | 123 | 367 | 287 | 337 | 418 |

The invention claimed is:

1. A resin composition comprising the following components (A) and (B): (A) a liquid-crystalline polyester (B) a titanium oxide filler having alumina adhered to its surface and having a volume average particle diameter of 0.27 to 0.4 μm, wherein the component (B) is contained in an amount of from 5 to 110 parts by mass relative to 100 parts by mass of the component (A).

2. The resin composition according to claim 1, wherein the component (B) is a titanium oxide filler obtained by surface-treating titanium oxide with alumina.

3. The resin composition according to claim 1, wherein the component (B) is a titanium oxide filler containing a titanium oxide produced by a chlorine method.

4. The resin composition according to claim 1 further comprising an inorganic filler other than the component (B).

5. A reflective plate obtained by molding the resin composition according to claim 1.

6. The reflective plate according to claim 5 having a reflectance of a light beam having a 460 nm wavelength of 70% or more, the reflectance being determined on the basis of a total light reflectance measuring method A of JIS K7105-1981 using a standard white plate of barium sulfate.

7. A method of producing a reflective plate comprising the steps of:
  (i) obtaining a resin composition containing the following components (A) and (B): (A) a liquid-crystalline polyester (B) a titanium oxide filler having alumina adhered to its surface and having a volume average particle diameter of 0.27 to 0.4 μm, wherein the component (B) is contained in an amount of from 5 to 110 parts by mass relative to 100 parts by mass of the component (A), and
  (ii) injection molding the obtained resin composition.

8. A light-emitting device comprising a reflective plate obtained by molding the resin composition according to claim 1, and a light-emitting element.

9. The light-emitting device according to claim 8, wherein the light-emitting element is an LED.

* * * * *